(12) United States Patent
Andrade et al.

(10) Patent No.: US 8,578,887 B2
(45) Date of Patent: Nov. 12, 2013

(54) LITTER BOX WITH SIFTER/SCRAPER SCOOP INSERT AND METHOD

(76) Inventors: Michael Steven Andrade, Montecito, CA (US); Brenda Carol Andrade, Oxnard, CA (US)

( * ) Notice: Subject to any disclaimer, the term of this patent is extended or adjusted under 35 U.S.C. 154(b) by 202 days.

(21) Appl. No.: 13/333,625

(22) Filed: Dec. 21, 2011

(65) Prior Publication Data

US 2012/0318203 A1    Dec. 20, 2012

Related U.S. Application Data

(60) Provisional application No. 61/520,946, filed on Jun. 17, 2011.

(51) Int. Cl.
*A01K 29/00* (2006.01)
(52) U.S. Cl.
USPC ............................................ 119/166; 119/165
(58) Field of Classification Search
USPC .................................. 119/161, 165, 166, 168
See application file for complete search history.

(56) References Cited

U.S. PATENT DOCUMENTS

| | | | |
|---|---|---|---|
| 5,272,999 A * | 12/1993 | Nussle | 119/166 |
| 5,823,137 A | 10/1998 | Rood et al. | |
| 5,893,336 A | 4/1999 | Vice et al. | |
| 6,494,165 B2 * | 12/2002 | Asbury | 119/166 |
| 8,109,237 B1 * | 2/2012 | Tsengas et al. | 119/166 |
| 2007/0056521 A1 | 3/2007 | Caputa et al. | |
| 2011/0088630 A1 * | 4/2011 | Krotts et al. | 119/166 |

OTHER PUBLICATIONS

Omega Paw, Roll' N Clean Litterbox, date unknown, 3 pages.
Petco, Lift n' Sift Cat Litter Pan, date unknown, 1 page.
Quick Sift, Litter Box and Sifting System, date unknown, 2 pages.

* cited by examiner

*Primary Examiner* — Kristen C Hayes
(74) *Attorney, Agent, or Firm* — Brinks Gilson & Lione (57) ABSTRACT

A litter box system and method include a sifter/scraper scoop configured to remove animal waste from litter material, without removing or transferring the litter material out of the main litter box. The main litter box is divided into two compartments by the scoop, which is releasably attached thereto. The scoop has approximately the same width and the same contour as the inside of the litter box. A pet-accessible compartment allows a pet to use the litter during elimination. The litter box system can be tipped up onto an angled end as part of a cleaning method allowing unclumped litter to pass through the scoop into a litter reservoir. The scoop can then be used to remove the waste. Then, litter can be directed back into the pet-accessible compartment by tipping the box the other way and replacing the scoop before placing the box levelly onto its bottom.

20 Claims, 9 Drawing Sheets

LITTER BOX WITH SIFTER/SCRAPER SCOOP INSERT AND METHOD

CROSS-REFERENCE TO RELATED APPLICATIONS

This application is a non-provisional application which claims priority to U.S. provisional application Ser. No. 61/520,946, filed Jun. 17, 2011, which is incorporated by reference herein in its entirety.

BACKGROUND

The present invention is in the field of litter boxes for pets. More particularly, the present invention relates to a litter box having a sifter/scraper scoop insert which is used to remove solid and clumped animal waste from the litter box without removing or transferring remaining litter material from the litter box.

Different animal species, including many commonly kept as pets may be trained to use a litter box. The convenience afforded to pets and their human companions by litter box availability can be offset somewhat by the challenges often associated with keeping the litter box clean. The task of removing animal waste and soiled litter has been addressed in a variety of ways over the last several decades. Some advances include the development of "clumping" litter that captures and eases removal of liquid waste while retaining generally unsoiled litter and reducing the volume of litter consumed while providing for a relatively clean and low-odor litter box. Various manual and automated scooping devices are known and used. However, a need remains for a device and method that will provide for ease of use and cleaning a litter box, particularly without necessitating removal from the box of litter that is being retained for continued use, but without leaving waste (on its own and/or with clumped litter) adhered to the interior surfaces of the litter box. The presently described embodiments address this need.

SUMMARY

A litter box system and method are provided with a sifter/scraper scoop insert that is configured to quickly and efficiently remove animal waste from remaining litter material which has not otherwise generally been contaminated by animal waste, without removing or transferring the litter material out of the main litter box. The main litter box is divided into two compartments by a sifter/scraper scoop which is releasably attached to the main litter box. The sifter/scraper scoop has approximately the same width and the same contour as the inside of the litter box. A first compartment of the litter box is a pet accessible side which is for pet use and the second compartment of the litter box is the litter reservoir side which is for receiving and storing uncontaminated litter during the cleaning process. The litter reservoir side has a canopy that helps prevent litter spillage during the cleaning process, makes the side inaccessible to pets, and has the sifter/scraper scoop's receiving dock integrated therein. The litter box is designed to separate the animal waste to be discarded (defined to include the animal's waste and any litter adhering to and/or clumped with it) from the litter material during a cleaning process in which the pet accessible side of the litter box is lifted causing the animal waste and litter material to migrate towards the litter reservoir side of the litter box. The animal waste is separated from the litter material via the sifting screen of the sifter/scraper scoop as the animal waste is collected therein and generally uncontaminated litter material (defined to include the litter not clumped with liquid waste and/or not adhering to solid waste) passes through into the litter reservoir.

After that step of the cleaning process is completed, the litter box remains in the tilted/elevated position due to the shape/angle of the back end of the bottom tray of the litter box and the weight of the litter material in the litter reservoir. While the litter box is in the tilted/elevated position any remaining animal waste that remains on the litter box bottom and/or sides can be readily seen. If remaining animal waste is present the sifter/scraper scoop may be detached from the main litter box (e.g., via an attachment/release mechanism that may be integrated into the handle and handle support component of the sifter/scraper scoop). The sifter/scraper scoop may then manually lifted/scraped along the bottom of the pet accessible side of the litter box to dislodge any remaining animal waste from the bottom and/or sides of the bottom tray via the angled scraping edges of the lower edge solid wall portion and bottom sides of the sifter/scraper scoop. The sifter/scraper scoop preferably is configured with approximately or substantially the same width and the same contour (s) as the inside of the litter box such that the scraping described may be completed with one motion along the length of the litter box. The front of a bottom tray mat also may be scraped if needed. The animal waste that was separated via sifting during step one of the cleaning process and dislodged via scraping during this step of the cleaning process is collected in the scoop recess of the sifter/scraper scoop and may then be discarded. The sifter/scraper scoop may then be reattached to the main litter box via an attachment mechanism. Thereafter, the litter material stored in the litter reservoir side may be reintroduced into the pet accessible side of the litter box by lifting the litter reservoir side and causing the litter material to migrate toward the pet accessible side. The sifter/scraper scoop may be attached to the main litter box in a manner that allows it to swing forward and upward so the litter material can pass beneath as well as through the sifter/scraper scoop during this litter-migration step. This will make the process of reintroducing the litter material back into the pet accessible side of the litter box more efficient in that it will expedite the litter migration and help prevent litter spillage during said migration. The litter box with the litter material therein may then be shaken and/or rocked back-and-forth so as to evenly distribute the litter material across the bottom of the pet accessible side of the of the litter box and thereafter be ready for pet use.

BRIEF DESCRIPTION OF THE DRAWINGS

FIGS. 14-21 show a method of use by illustrating the litter box embodiment of FIG. 1 in a diagrammatic longitudinal section view through successive steps of a method of use.

DETAILED DESCRIPTION OF EMBODIMENTS

Various embodiments will be described more fully hereinafter. The invention is defined by the claims, may be embodied in many different forms, and should not be construed as limited to the embodiments set forth herein; rather, these embodiments are provided so that this disclosure will be thorough and complete, and will fully convey enabling disclosure to those skilled in the art. As used in this specification and the claims, the singular forms "a," "an," and "the" include plural referents unless the context clearly dictates otherwise. Embodiments are described with reference to the drawings in which like elements generally are referred to by like numerals. The relationship and functioning of the various elements of the embodiments may better be understood by reference to the following detailed description. However, embodiments are not limited to those illustrated in the drawings. It should be understood that the drawings are not necessarily to scale, and in certain instances details may have been omitted that are not necessary for an understanding of embodiments disclosed herein, such as—for example—conventional fabrication and assembly.

Figure 1:
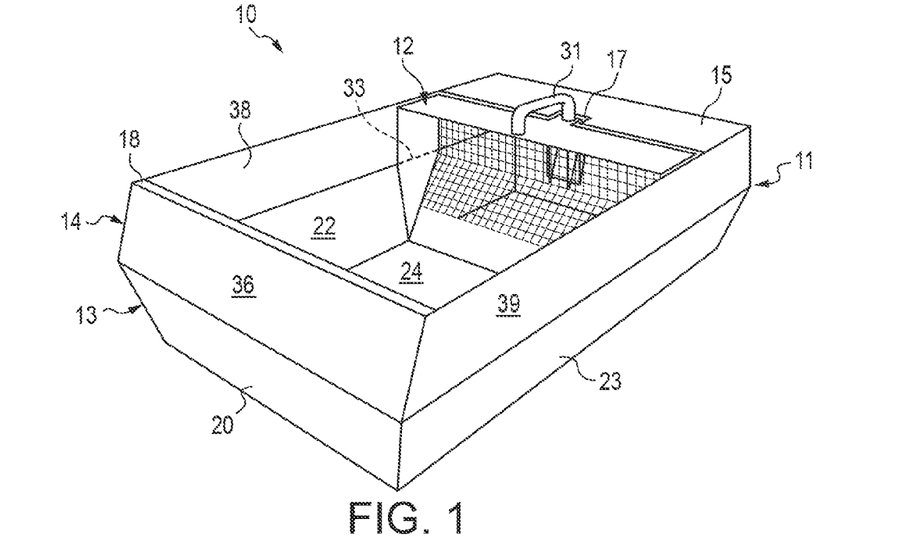
FIG. 1 is a perspective view of the litter box embodiment.

A perspective view of the litter box 10 is shown in FIG. 1, which litter box may best be understood with reference to the structural and function features described below and shown in FIGS. 1-13. The litter box 10 generally includes a removably attached sifter/scraper scoop 12, a bottom tray 13 and a top component 14 (which may be embodied generally as a rectilinear wall member). The main litter box body 11 includes the bottom tray 13 and top component 14. The bottom tray 13 and top component 14 of the litter box body 11 may be integrated or they may be separate with the top component 14 fitting on the bottom tray 13 in manner that helps prevent litter spillage from the litter box 10 during pet use and a cleaning process.

The litter box body 11 and sifter/scraper scoop 12 of the litter box 10 may be constructed of metallic and nonmetallic materials. The preferred embodiment of the litter box body 11 preferably is made of a nonmetallic material that is suitable for injection molding. One preferred embodiment of the sifter/scraper scoop 12 preferably is made of a metallic material for durability and sturdiness.

The top component 14 includes a front end 36, a back end 37, opposite sides 38 and 39, a canopy 15, a receiving dock 17 for the sifter/scraper scoop 12, and an overhanging ledge 18 on the pet accessible side 19 of the litter box. The canopy 15 covers the litter reservoir side 16 of the litter box and has the receiving dock 17 integrated therein. The top component 14 assists in preventing litter spillage from the litter box body 11 during pet use and the cleaning process.

The bottom tray 13 includes a front end 20, a back end 21, opposite sides 22, 23, and a bottom 24, where the front, back, and sides are flared/angled out from the outer perimeter of the bottom 24.

When the sifter/scraper scoop 12 is nested in the litter box body 11, it divides the interior of the litter box body 11 into two compartments; the larger of the two compartments is the front, pet accessible side 19, which is configured for pet use, and the smaller compartment is the rear, litter reservoir side 16, which may be used to temporarily store litter material 47 (to be kept in use) once it has been separated from the animal waste 46 by the sifter/scraper scoop 12.

As shown with reference to the drawings, and particularly with reference to FIGS. 8-13, the sifter/scraper scoop 12 includes generally planar sifting screens 25, 27, opposite lateral sides 28, 29, a top wall formed as a canopy component 30, a handle 31, a handle support component 32, and may also include an attachment/release mechanism (not shown in detail, although those of skill in the mechanical arts will appreciate that any number of detent, clasp, catch, latch, or other attachment mechanisms may be used to removably attach the sifter/scraper scoop 12 to the litter box body 11). The lower sifting screen 25 is angled and has a solid wall portion configured as a scraping blade 26 along its bottom edge, and the upper sifting screen 27 is generally vertical. The shape of the sifting screens 25, 27 (or screen, as the components of the sifter/scraper scoop 12 are integrated and sifting screens 25, 27 may be formed as a single unit) may vary. Stated differently, the rear wall of the scoop 12 includes at least one sifting screen element (which may be embodied in any number of manners including or excluding cross-members) and a solid lower wall portion extending across the width of the scoop. In certain embodiments the height of the solid wall portion 26 of the lower sifting screen 25 will correlate (that is, be about the same or slightly greater height/depth than) a specified preferred litter level of the litter box body 11 to help prevent litter material 47 from transferring into the litter reservoir side 16 of the litter box during normal use and/or before beginning the cleaning process. FIG. 14 illustrates one such preferred embodiment, where the scraping blade 26 is configured to function as a retaining wall to generally keep litter in the pet-accessible side 19 of the box 10 during use outside of a cleaning operation.

The dashed line 33 indicates where the sides 28, 29 of the sifter/scraper scoop 12 angle, slope, or curve inward to parallel the contour of the bottom 24 and sides 22, 23 of the bottom tray 13 of the litter box body 11 and to differentiate the sides 28, 29 from the bottom sides 34, 35 of the sifter/scraper scoop 12. The solid wall portion 26 of the lower sifting screen 25 and the edges of the bottom sides 34, 35 of the sifter/scraper scoop 12 are angled to assist in the litter material 47 and animal waste 46 migration during step one of the cleaning process and subsequent scraping, if required, by the sifter/scraper scoop 12 during step two of the cleaning process. It will generally be preferred that the outer leading edges of the scoop 12 contact and/or fit very closely to the inner surface contours of the litter box body 11.

Figure 20:
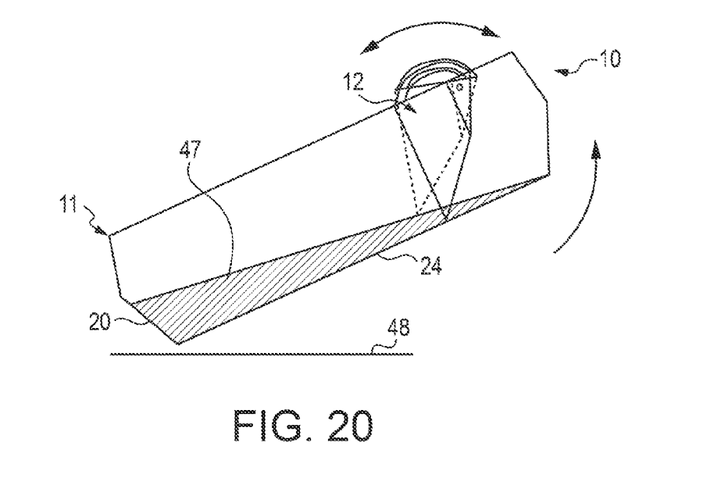
FIG. 20 shows the litter box embodiment during a step of the cleaning process wherein the clean litter reservoir side of the litter box is lifted.

The sifter/scraper scoop 12 may attach/detach to/from the litter box body 11 via an attachment/release mechanism (not shown in detail) which may vary in different embodiments. For example, the handle 31 of the sifter/scraper scoop 12 may be equipped with a toggle or lever (not shown) configured to actuate attachment/release of the scoop 12 from the litter box body 11. As another example, an attachment/release mechanism may employ the use of spring-loaded detent members 42, 43 which may protrude and retract through openings of the handle support component 32 and releasably engage the openings 40, 41 of the receiving dock 17 of the top component 14, thereby facilitating attaching/detaching the sifter/scraper scoop 12 from the litter box body 11. In addition to or instead of being spring-loaded, the detent members 42, 43 may be embodied as locking pins actuatable by a switch, lever, or other means that will easily be understood by those of skill in the mechanical arts. Such a design of the receiving dock 17 and the use of detent members 42, 43 in an attachment/release mechanism may allow the sifter/scraper scoop 12 to swing forward and upward during step three of the cleaning process. FIG. 20 shows an illustration of the envisioned swinging motion, and the description below of FIG. 20 further describes the envisioned embodiment. The sifter/scraper scoop 12 may be kept from swinging backward by the receiving dock 17 of the top component 14 and the contact the sifter/scraper scoop 12 has with the bottom tray 13.

Figure 23:
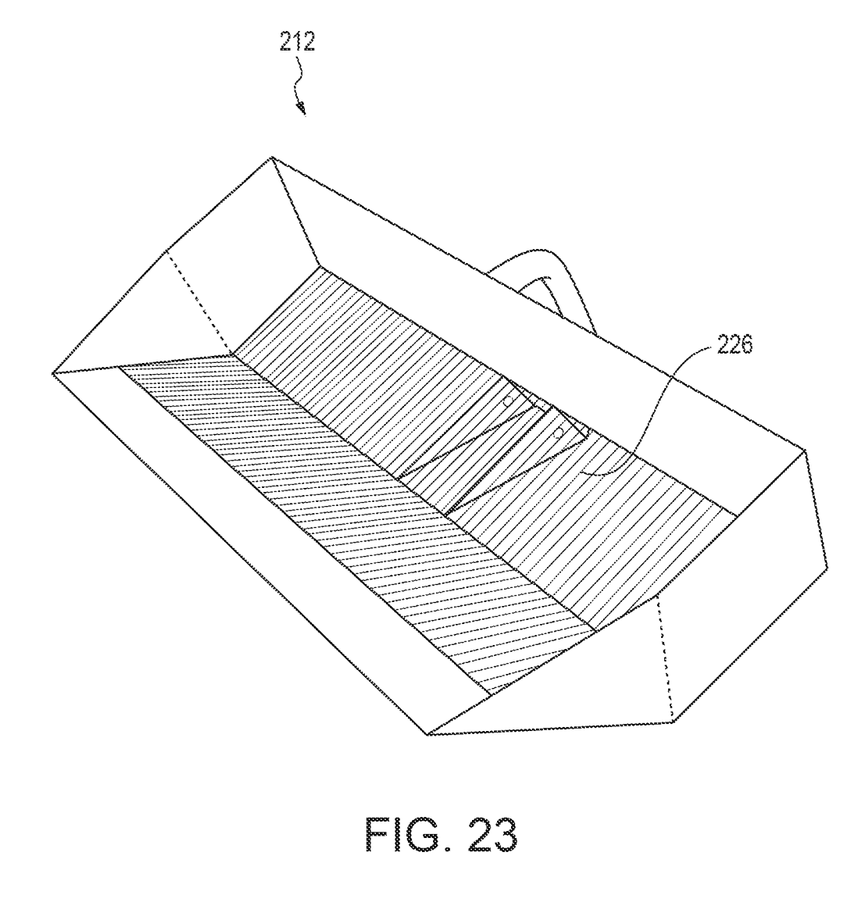
FIG. 23 shows a litter box embodiment including a sifter/scraper scoop with a screen member embodied as generally vertical slats rather than a sieve, grate, or other lattice or cross-membered screen member.

The openings of the lattice, grate, sieve, or other cross-membered structure of the sifting screens 25, 27 of the sifter/scraper scoop 12 preferably will be configured so that loose (unclumped, generally uncontaminated) litter material 47 can pass through it, thereby separating the animal waste 46, which may be in or with clumped litter material, from the litter material 47. Those openings of the sifting screens 25, 27 of the sifter/scraper scoop 12 are shown in a particular configuration in the drawings, but the configuration may vary. For example a primarily vertical opening configuration with a plurality of parallel openings (e.g., slots) may be used in some embodiments. As one example, FIG. 23 shows an embodiment of the scoop 212 as including comb-like fingers, wires, bars, or slats 226 rather than the grid-like configurations noted with respect to other embodiments, although otherwise constructed in generally the same manner as the other illustrated embodiments. With the embodiments described herein, preferred methods of use generally will include utilization of "clumping" types of litter, well-known by pet owners, which forms clumped aggregates to contain liquid. Non-clumping litter may be used, but non-clumping clay-type or other litters may not offer some of the same methodological advantages provided by utilization of clumping litter. However, certain moisture-absorbing, non-clumping litters (e.g., silica gel litter) may be effectively used with the present device embodiments and methods to collect and remove solid animal waste. For sifting screens with cross-members, the openings may include an absolute (for each) or an average area from about 0.5 to about 1 $cm^2$, and for sifting screens without cross members, adjacent tines, slats, or other screening members may be about 0.5 to about 1 cm apart.

A tilting handle (shown only in FIG. 15 by way of example) may be located on the exterior of the front (handle 20a) and/or rear (handle 21a) of the litter box body 11 to lift/tilt either the pet accessible side 19 and/or the litter reservoir side 16, respectively, during a cleaning process. Such tilting handles may be integrated onto the front end 36 and back end 37 of the top component 14, onto the front end 20 and back end 21 of the bottom tray 13 of the litter box body 11, where the top component 14 and bottom tray 13 meet if the two are separate, along one or both lateral sides, or any combination thereof, including that the handles may be fixedly or movably mounted. Any tilting handle(s) for the back end of the litter box body 11 most preferably will be integrated in such a manner as to maintain the capability of the litter box to remain in the tilted/elevated position during steps one and two of the-cleaning process.

Figure 2:
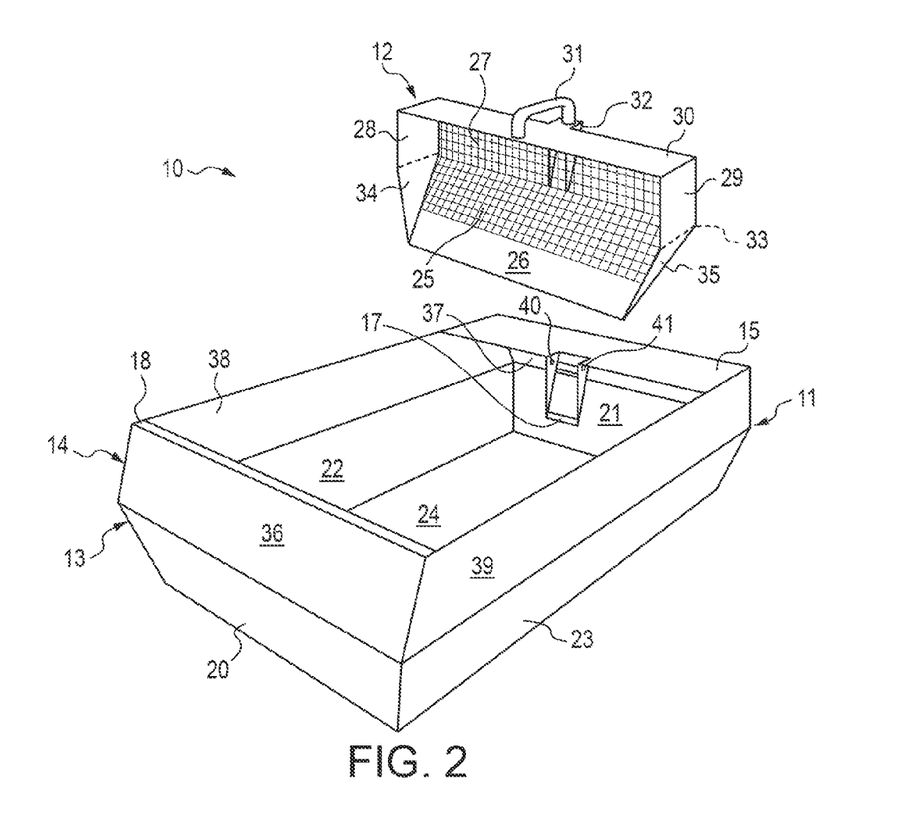
FIG. 2 is a perspective view of the litter box embodiment shown with the sifter/scraper scoop removed from the main litter box.

FIG. 2 shows a perspective view of the litter box 10 is shown with the sifter/scraper scoop 12 removed from the litter box body 11. When the sifter/scraper scoop 12 is detached from the receiving dock 17 it can be removed from the litter box body 11 or it can be lifted along the bottom tray 13, scraping free any remaining animal waste 46 before it is removed from the litter box body 11. Upon visual inspection, a user may note that there is no remaining animal waste 46 stuck on the bottom tray 13 and thus no need to lift the sifter/scraper scoop 12 along the bottom 24 of the pet accessible side 19 to dislodge animal waste 46.

Figure 3:
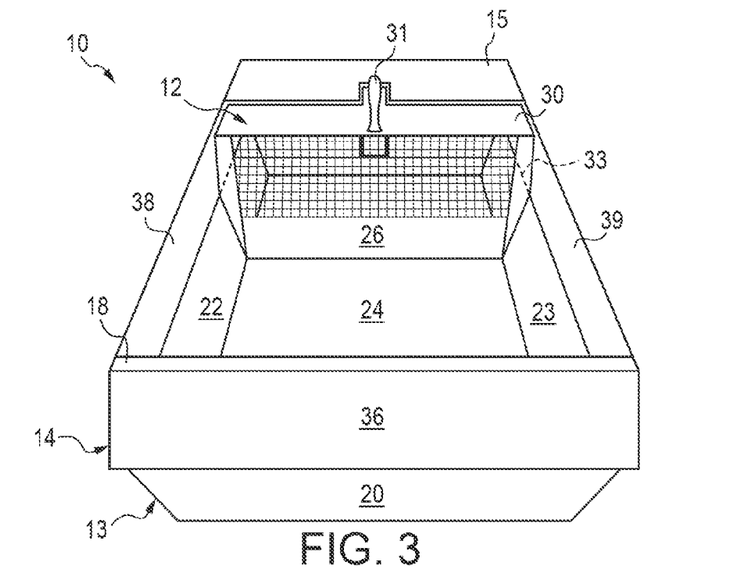
FIG. 3 is a front perspective view of the litter box embodiment.

A front perspective view of the litter box 10 is shown in FIG. 3. The sifter/scraper scoop 12 is releasably attached (e.g., via an attachment/release mechanism) and nested inside the bottom tray 13 of the litter box body 11.

The contour of the sifter/scraper scoop 12 preferably is similar to the cross-sectional contours of the litter box body 11. The width of the bottom portion (that which is below the dashed line 33) of the sifter/scraper scoop 12 preferably is approximately or substantially the same as the width of the inside of the bottom tray 13 of the litter box body 11. The width of the top portion (that which is above the dashed line 33) of the sifter/scraper scoop 12 preferably is approximately or substantially the same as the width of the inside of the top component 14 of the litter box body 11. As such, outer contours of the scoop 12 are configured to complement and to be approximately the same dimensions as inner contours across the width and up the lateral sides 22, 23, 38, 39 of the main litter box body 11. In this manner, the sifter/scraper scoop 12: (i) divides the litter box 10 into two compartments—the pet accessible side 19 and the litter reservoir side 16 (see FIG. 5); (ii) separates the animal waste 46 from the litter material 47 via the sifting screens 25, 27 during step one of the cleaning process; (iii) dislodges any remaining animal waste 46 affixed to the bottom 24, sides 22, 23, and front end 20 of the bottom tray 13 with the angled scraping edges of the solid wall portion 26 of the lower sifting screen 25 and the bottom sides 34, 35 of the sifter/scraper scoop 12 during step two of the cleaning process; and (iv) collects the animal waste 46 therein utilizing the scoop recess of the sifter/scraper scoop 12. Having the width of the sifter/scraper scoop 12 be approximately or substantially the same as the width of the inside of the litter box body 11 provides for generally effectively dislodging any remaining animal waste 46 during step two of the cleaning process with a single scooping/scraping motion as the sifter/scraper scoop 12 scrapes the bottom 24, the sides 22, 23, and the front end 20 of the bottom tray 13 with said motion.

Figure 4:
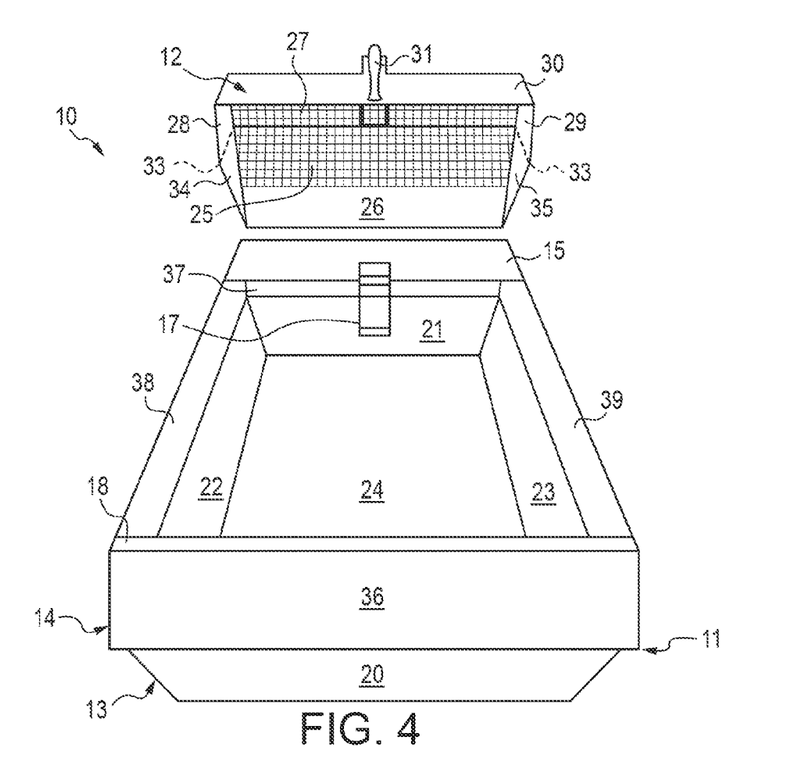
FIG. 4 is a front perspective view of the litter box embodiment shown with the sifter/scraper scoop removed from the main litter box.
Figure 5:
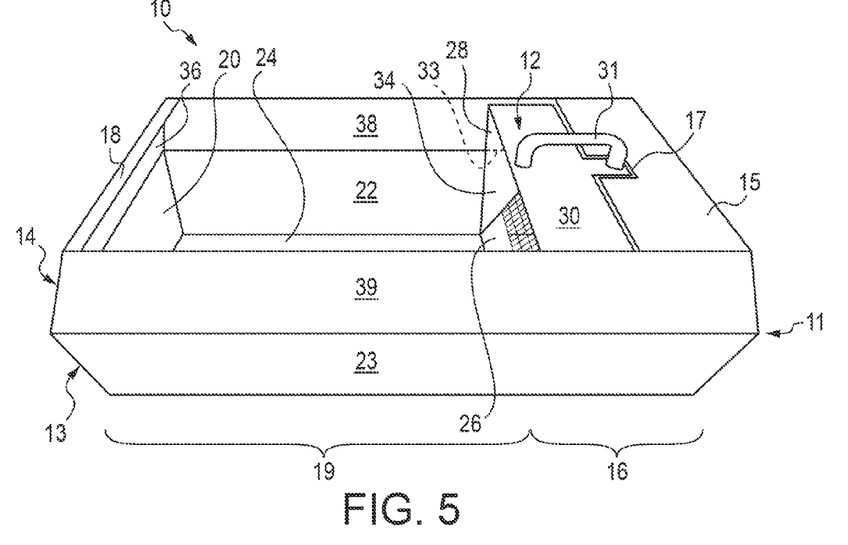
FIG. 5 is a side perspective view of the litter box embodiment.

FIG. 4 shows a front perspective view of the litter box 10 with the sifter/scraper scoop 12 removed from the litter box body 11. FIG. 5 shows a side perspective view of the litter box 10 and identifies the pet accessible side 19 and the litter reservoir side 16.

Figure 6:
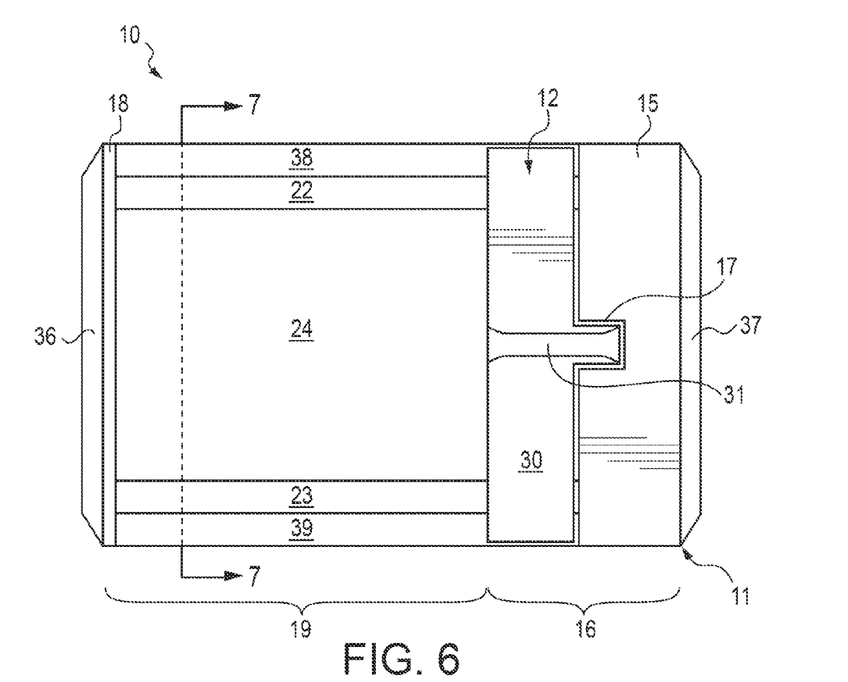
FIG. 6 is a top perspective view of the litter box embodiment.

The canopy component 30 of the sifter/scraper scoop 12 functions like an extension of the canopy 15 of the top component 14, which assists in preventing litter spillage during step one of the cleaning process. When the sifter/scraper scoop 12 is manually utilized, the canopy component 30 assists in minimizing the likelihood that the person's hand grasping the handle 31 of the sifter/scraper scoop 12 will come in contact with animal waste 46 (see FIGS. 14-18). In FIG. 6, a top perspective view of the litter box 10 shows how the canopies 15, 30 cover the litter reservoir 16 and the collection cavity of the scoop 12. The canopy 30 may also prevent animal waste from being eliminated directly on or through the screening portion of the scoop 12.

Figure 7:
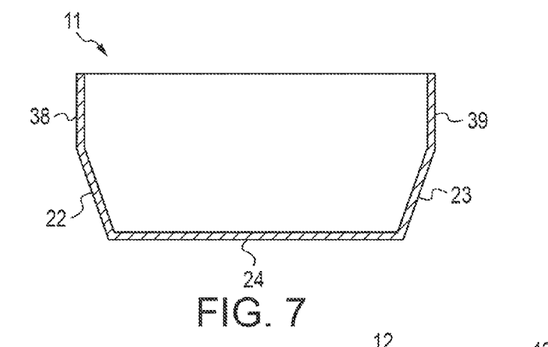
FIG. 7 is a diagrammatic transverse section view (along line 7-7 of FIG. 6) of the main litter box body of the litter box embodiment.

FIG. 7 shows a diagrammatic transverse section view of the litter box body 11 of the litter box 10. The sides 38, 39 of the top component 14 may generally be vertically oriented to allow the sifter/scraper scoop 12 to be inserted and removed from the litter box body 11. The shape of the litter box body 11 and thus the shape of the sifter/scraper scoop 12 may vary (e.g., the lateral sides may be vertical, sloped, rounded or otherwise configured in a manner that will allow effective use of the cleaning method described herein).

Figure 8:
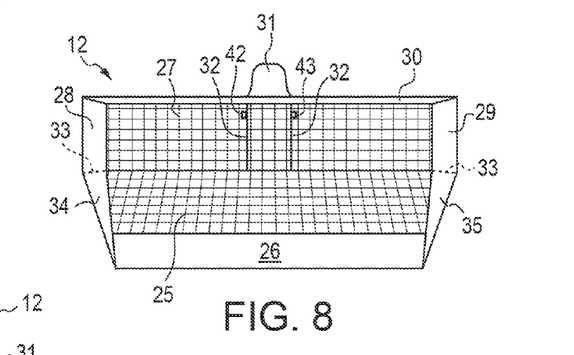
FIG. 8 is a front perspective view of a sifter/scraper scoop of a litter box embodiment, shown separately from the main litter box.
Figure 9:
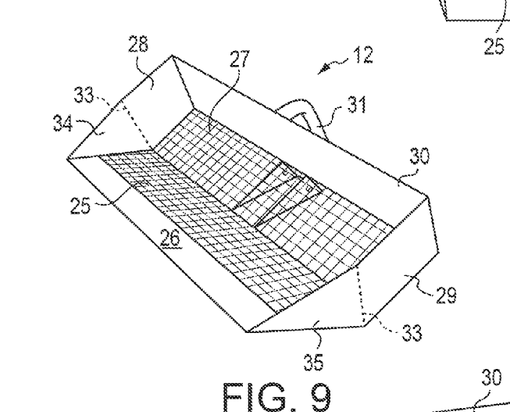
FIG. 9 is a perspective view of the sifter/scraper scoop of the litter box embodiment.
Figure 10:
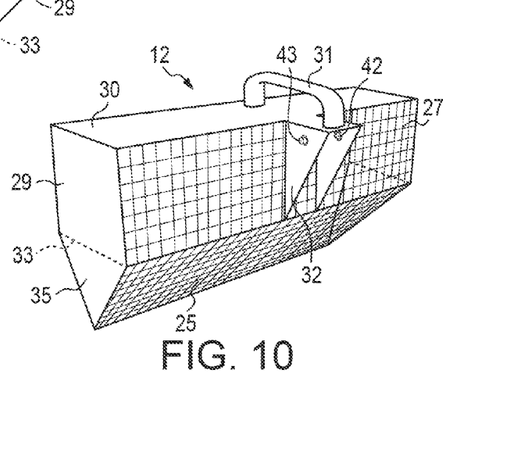
FIG. 10 is a rear perspective view the sifter/scraper scoop of the litter box embodiment.

FIGS. 8-10 show perspective views of the sifter/scraper scoop 12. The handle support component 32 may have solid sides except for openings through which, for example, detent members 42, 43 of an attachment/release mechanism may operate. The rear of the handle support component 32 may be open so litter can more freely pass through the sifter/scraper scoop 12 into the litter reservoir side 16 of the litter box body 11 during step one of the cleaning process and from the litter reservoir side 16 to the pet accessible side 19 during step three of the cleaning process.

Figure 11:
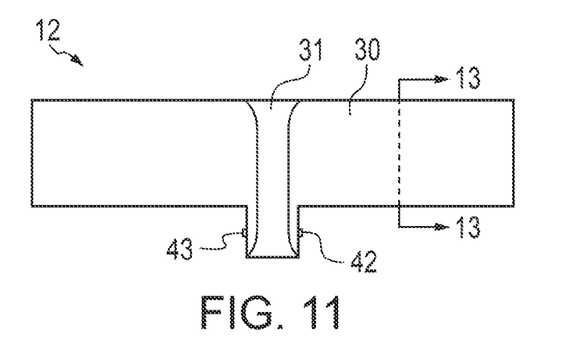
FIG. 11 is a top plan view of the sifter/scraper scoop of the litter box embodiment.
Figure 12:
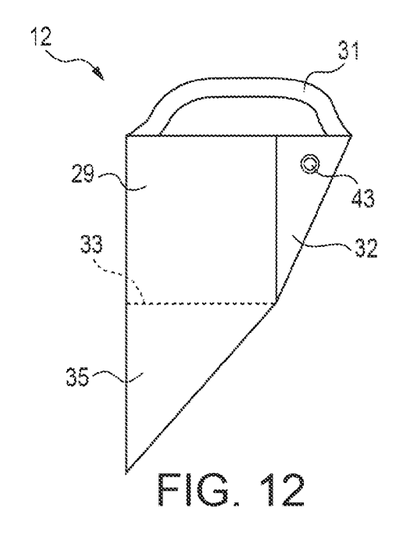
FIG. 12 is a side elevation view of the sifter/scraper scoop of the litter box embodiment.

FIGS. 11-12 show top plan views of the sifter/scraper scoop 12. Detent members 42, 43 are shown protruding from the handle support component 32 as one embodiment of an attachment/release mechanism. A toggle or other actuation mechanism or structure of the handle 31 of the sifter/scraper scoop 12 may operate to retract 42, 43 through the openings 40, 41 of the receiving dock 17 of the top component 14, such that they detach the sifter/scraper scoop 12 from the litter box body 11 and allow it to be maneuvered.

Figure 13:
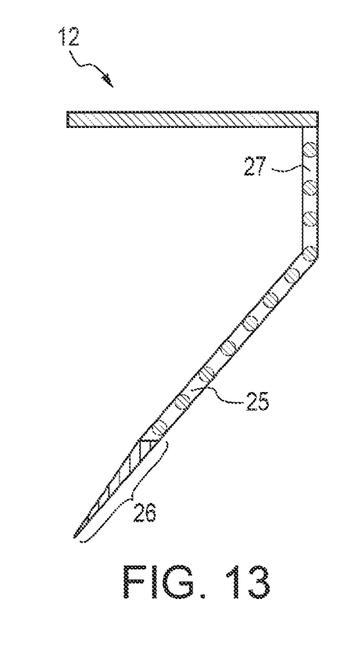
FIG. 13 is an enlarged cross section view through the front edge of the sifter/scraper scoop (along line 13-13 of FIG. 11) showing the shape of the edge of the solid wall portion of the lower sifting screen.
Figure 14:
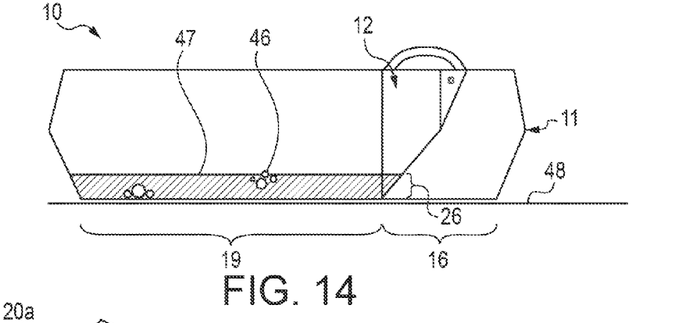
FIG. 14 shows the litter box embodiment with animal waste and litter material prior to cleaning.

FIG. 13 depicts a section view of the sifter/scraper scoop 12 along line 13-13 of FIG. 11 showing the shape of the edge of the solid wall portion 26 of the lower sifting screen 25. FIG. 13 shows how the top surface of the solid wall portion 26 may taper angularly downward to meet the flat bottom surface and form a (preferably sharp) leading edge extending transversely across the bottom front end of the sifter/scraper scoop 12. The lower lateral sides 34, 35 of the sifter/scraper scoop 12 have similar edges that taper angularly downward from the interior surface to meet the flat outer surface of the scoop 12. The leading edges of the solid wall portion 26 and the bottom sides 34, 35 of the sifter/scraper scoop 12 will operate to dislodge any remaining animal waste 46 that may be affixed to the bottom tray 13 during step two of the cleaning process and may also assist in the litter migration from the pet accessible side 19 to the litter reservoir side 16 during step one of a cleaning process.

FIG. 14 diagrammatically shows a longitudinal cross section of the litter box 10 with animal waste 46 and litter material 47 therein prior to cleaning. The line 48 beneath the litter box 10 represents a surface (e.g., a level surface such as a floor or shelf) and is provided to illustrate a preferred position of the litter box 10 in relation to said level surface prior to, during and after the cleaning process.

Figure 15:
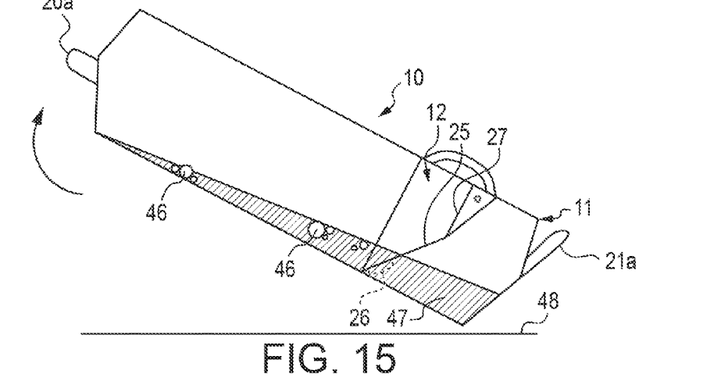
FIG. 15 shows the litter box embodiment during a step of the cleaning process where the pet accessible side of the litter box is lifted.

FIG. 15 shows the litter box 10 during step one of a cleaning process where the pet accessible side 19 of the litter box is lifted, tilting the litter box and causing the animal waste 46 and litter material 47 to travel toward the litter reservoir side 16 of the litter box and through the sifter/scraper scoop 12, where the animal waste 46 is separated from the litter material 47 via the sifting screens 25, 27 of the sifter/scraper scoop 12.

Figure 16:
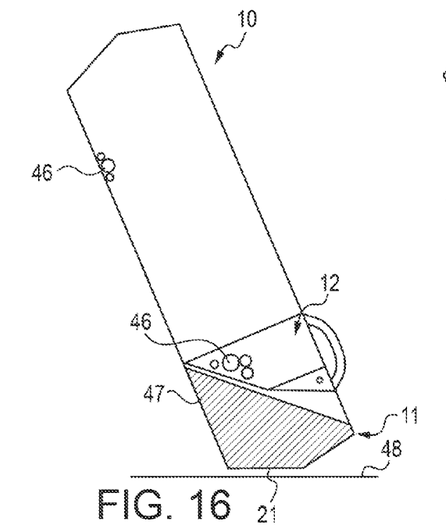
FIG. 16 shows the litter box embodiment in the tilted/elevated position after step one of the cleaning process is completed.

In FIG. 16, the animal waste 46 is shown as having been separated from the litter material 47. The animal waste 46 that is not stuck to the bottom tray 13 has been collected within the collection cavity recess of the sifter/scraper scoop 12, and the litter material 47 that has passed through the sifting screens 25, 27 has collected in the litter reservoir 16. The weight of the litter material 47 in the litter reservoir 16 generally will keep the litter box in the tilted/elevated position shown. The shape/angle of the back end 21 of the bottom tray 13 of the litter box body 11 will determine the angle at which the litter box 10 rest while in the tilted/elevated position and that angle may vary in different embodiments. To save space it is preferred, but not necessary, that the angle of the lower sifting screen 25 of the sifter/scraper scoop 12 will be similar to the angle at which the litter material 47 naturally settles after completion of step one of the cleaning process. The angled lower sifting screen 25 also facilitates the animal waste 46 collecting in the base of the sifter/scraper scoop 12 recess. With the litter box in the tilted/elevated position and the litter material 47 in the litter reservoir 16 any remaining animal waste 46 on the bottom tray 13 or lateral sides will be exposed and generally or clearly visible. Stated differently, although a vertical rear wall will work with the present inventive concept and is contemplated as being within its scope, at least a portion of the front wall, the rear wall, or both preferably will be oriented at an obtuse non-vertical angle relative to the bottom 24, where a preferred range of angles is between about >90° and about 130° with one preferred embodiment having front wall and rear wall angles of about 105° (although the angle may range from acute angles less than 90° to just under 180°—i.e., nearly horizontal, although it will be appreciated that a steeper—but not too steep—angle will generally be preferred). The side walls or some portion thereof may include the same or a different angle that front and rear walls, and each wall may be oriented at a different angle than the others, although it may be functionally and/or aesthetically preferred to have the lateral side walls symmetrically oriented. The angled portion(s) of the front wall and rear wall may be at different angles than each other (e.g., the rear wall may be at a steeper angle nearer vertical than the front wall or vice versa). As will be appreciated from the method described, it is strongly preferred that the rear wall 21, 37 include at least an angled portion that includes sufficient angle and area that the box 10 may securely rest upon that portion (see, e.g., FIGS. 16-19). Virtually any such angle may function within the scope of the presently disclosed embodiments, and there is a strong preference for the front and/or rear wall to be oriented at an angle that will allow the box to be securely stood up off its bottom and remain generally freestanding during a cleaning operation.

Figure 17:
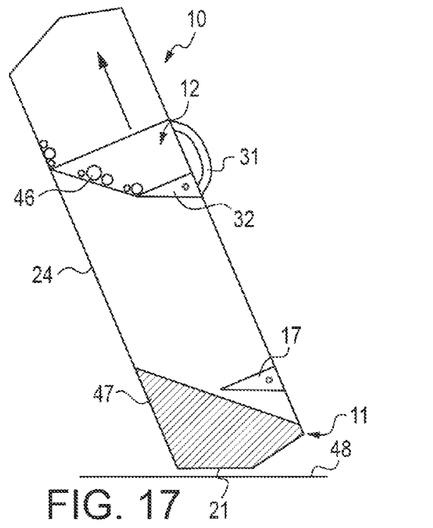
FIG. 17 shows the litter box embodiment in the tilted/elevated position during another step of the cleaning process where the sifter/scraper scoop is lifted while scraping along the bottom of the litter box.
Figure 18:
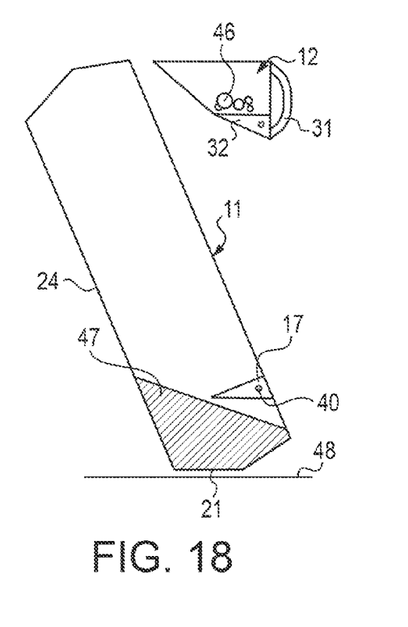
FIG. 18 shows the litter box embodiment in the tilted/elevated position with the sifter/scraper scoop apart from the main litter box.

Thereafter, as shown in FIG. 17, during step two of the cleaning process, the sifter/scraper scoop 12 may be detached from the litter box body 11 and lifted while scraping along the bottom 24 of the litter box, thereby dislodging any remaining animal waste 46 that was not dislodged during step one of the cleaning process. The sifter/scraper scoop 12 will thereby dislodge remaining animal waste 46 affixed to the litter box bottom 24, sides 22, 23, and front 20 of the bottom tray 13 of the pet accessible side 19 of the litter box body 11. The animal waste 46 that is dislodged from the bottom 24 of the litter box by the sifter/scraper scoop 12 during step two is collected into the scoop 12 as shown in FIG. 18. If not waste or clumped litter 46 was stuck in the box, the scraping step shown in FIG. 17 may not be needed, and the scoop 12 may just be removed. In any event, it is preferable that the amount of litter present and the angle of the rear wall be such that the box 10 will remain freestanding in the tilted position (e.g., as is shown by way of example in FIG. 17). The receiving dock 17 allows the sifter/scraper scoop 12 to be directly removed/replaced by either going through the opening in the canopy 15 (if no scraping is needed or the sifter/scraper scoop 12 is being put back) or going forward from the canopy.

Figure 19:
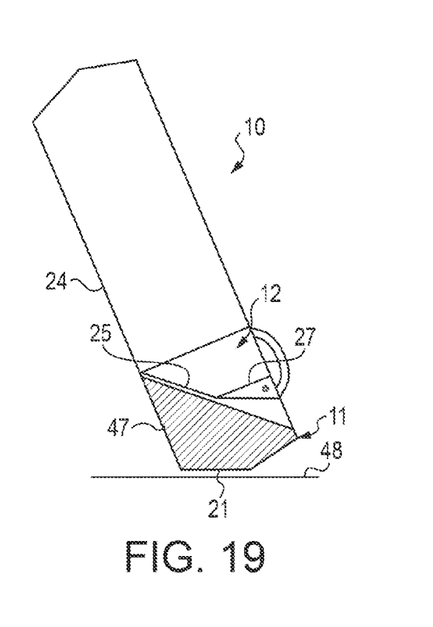
FIG. 19 shows the litter box embodiment in the tilted/elevated position after the animal waste collected in the sifter/scraper scoop has been discarded and with the sifter/scraper scoop reattached to the main litter box body.

FIG. 19 depicts the litter box 10 after the animal waste 46 collected in the sifter/scraper scoop 12 has been discarded and the sifter/scraper scoop 12 has been reattached to the litter box body 11. As shown in FIG. 20, during step three of the cleaning process, the litter reservoir side 16 of the litter box may be lifted so that the litter material 47 will travel toward the pet accessible side 19 of the litter box. As noted above, the sifter/scraper scoop 12 may be attached to the litter box body 11 in a manner that allows it to swing forward and upward so the litter material 47 can pass both beneath and through the sifter/scraper scoop 12 during step three which will make the process more efficient in that it will expedite the litter migration and help prevent litter spillage during said migration. The overhanging ledge 18 at the front end of the pet accessible side 19 of the litter box 10 will help contain the litter material 47 during the litter migration.

Figure 21:
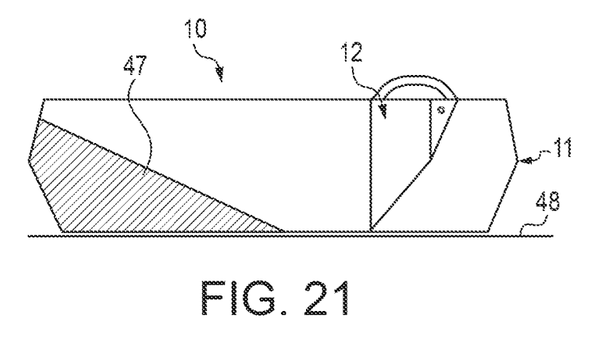
FIG. 21 shows the litter box embodiment after the cleaning process is completed and the clean litter material is back in the pet accessible side of the litter box.

FIG. 21 shows the litter box 10 after step three of the cleaning process is completed and with the litter material 47 has been tipped back into the pet accessible side 19 of the litter box. Thereafter, as shown in FIG. 22, the litter material 47 may be more evenly redistributed along the bottom 24 of the pet accessible side 19 of the litter box by an up and down and/or side to side movement of the litter box 10.

OPERATION

Figure 22:
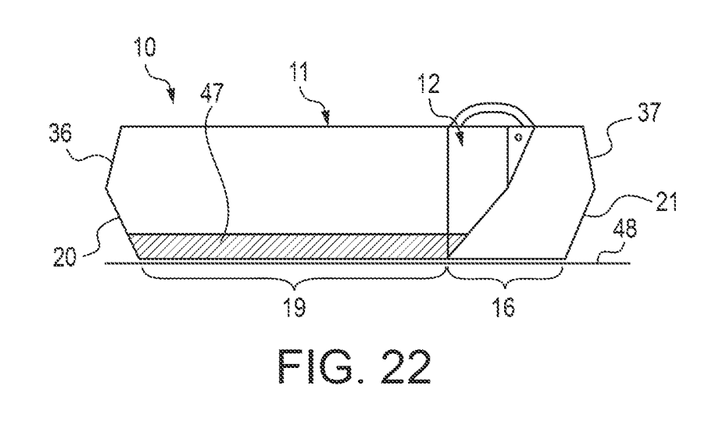
FIG. 22 shows the litter box embodiment after the litter material is redistributed along the bottom of the pet accessible side of the litter.

A method of use as described herein may be understood with reference to FIGS. 14-22. As shown in FIG. 22, as part of a method of use of the litter box 10, the sifter/scraper scoop 12 is placed and attached into the litter box body 11. The litter material 47 may then be poured into the pet accessible side 19 of the litter box body 11. The litter box with the litter material 47 therein may then be shaken and/or rocked back-and-forth so as to evenly distribute the litter material 47 across the bottom 24 of the pet accessible side 19 of the bottom tray 13 of the of the litter box body 11. A specified litter amount will be recommended and a litter level line may be indicated on the litter box (e.g., a line or other indicia of a recommended top level of litter may be provided). A conventional clumping litter material 47 is recommended.

As shown in FIG. 14, FIG. 15, and FIG. 16, when the litter material has become contaminated with animal waste 46, the clumps and solids can be easily and quickly separated from the litter material 47 during step one of the cleaning process. In step one of the cleaning process, the pet accessible side 19 is lifted thereby causing the animal waste 46 and litter material 47 to migrate toward the litter reservoir side 16 of the litter box. The animal waste 46 is separated from litter material 47 via the sifting screens 25, 27 of the sifter/scraper scoop 12 and collected therein. The litter material 47 passes through the sifter/scraper scoop 12 into the litter reservoir side 16 of the litter box. It may be helpful while tilting the box 10 to shake it slightly to assist movement of the litter through the scoop 12. The shape of the back end 21 of the litter box body 11 and the weight of the litter material 47 in the litter reservoir side 16 keep the litter box in the tilted/elevated position. With the litter material 47 in the litter reservoir 16 and litter box in the tilted/elevated position any remaining animal waste 46 that is affixed to the bottom 24 of the pet accessible side 19 of the litter box is clearly visible.

As shown in FIG. 17 and FIG. 18, if animal waste 46 remains then during step two of the cleaning process the sifter/scraper scoop 12 is detached and manually lifted along the bottom 24 of the pet accessible side 19 thereby dislodging any remaining animal waste 46 affixed to the bottom 24, sides 22, 23, and the front end 20 of the bottom tray 13 via the angled scraping edges of the sifter/scraper scoop 12. When the bottom edge (solid wall portion 26) of the sifter/scraper scoop 12 reaches the front end 20 of the bottom tray 13 it is lifted along the bottom of said front end 20 and then away from the litter box body 11. The scraping motion described in step two is designed to entail one motion because the sifter/scraper scoop 12 is approximately the same width as the inside of the litter box body 11. The animal waste 46 that has been dislodged during step two collects in the scoop recess of the sifter/scraper scoop 12. The animal waste 46 collected within the sifter/scraper scoop 12, either through sifting during step one and/or through scraping during step two, may then be discarded. If no animal waste 46 remains then the scraping motion described in step two is not required and the sifter/scraper scoop 12 is detached and directly removed from the litter box body 11 and then the animal waste 46 therein is discarded.

As shown in FIG. 19, once the animal waste 46 has been discarded the now empty sifter/scraper scoop 12 is inserted into the litter box body 11 and reattached via an attachment mechanism (not shown). In some embodiments, a waste-storage compartment may be included. This could be, for example, integrated into the scoop, the litter reservoir, or another element, and preferably would be closable to contain odor, as well as preferably constructed to accommodate a removable and/or replaceable liner.

As shown in FIG. 20 and FIG. 21, in step three of the cleaning process the litter reservoir side 16 of the litter box is lifted thereby causing the litter material 47 to migrate toward the pet accessible side 19 of the litter box. The sifter/scraper scoop 12 may be releasably attached and configured to swing forward and upward so that the litter material 47 can travel beneath as well as through the sifter/scraper scoop 12 during said litter migration. This swinging motion will assist in more quickly returning the litter material 47 to the pet accessible side 19 of the litter box and helping prevent litter spillage during step three. As shown in FIG. 22, the litter box with the litter material 47 therein may then be shaken and/or rocked back-and-forth so as to evenly distribute the litter material 47 across the bottom 24 of the pet accessible side 19 of the bottom tray 13 of the of the litter box body 11 and is ready for pet use.

Those of skill in the art will appreciate that embodiments not expressly illustrated herein may be practiced within the scope of the claims, including that features described herein for different embodiments may be combined with each other and/or with currently-known or future-developed technologies while remaining within the scope of the claims. Although specific terms are employed herein, they are used in a generic and descriptive sense only and not for purposes of limitation. It is therefore intended that the foregoing detailed description be regarded as illustrative rather than limiting. And, it should be understood that the following claims, including all equivalents, are intended to define the spirit and scope of this invention. Furthermore, the advantages described above are not necessarily the only advantages of the invention, and it is not necessarily expected that all of the described advantages will be achieved with every embodiment.

We claim:

1. A litter box system comprising:
    a main litter box body including a generally planar bottom with a front wall, a rear wall, and two lateral side walls connecting the front and rear walls extending upward from the bottom;
    a canopy formed as a top wall extending across a rear width of the main litter box body to form, with the rear wall and rear portions of the bottom and lateral side walls, a litter reservoir configured to receive and hold generally unsoiled litter during a cleaning operation; and
    a sifter/scraper scoop removably attached to the canopy, where the scoop includes:
        a top handle;
        top wall and side walls forming three sides;
        a rear wall including at least one sifting screen element and a solid lower wall portion extending across the width of the scoop;
    wherein outer contours of the scoop are configured to complement and to be approximately the same dimensions as inner contours across the width and up the lateral sides of the main litter box body.

2. The litter box system of claim 1, wherein at least a portion of the front wall, the rear wall, or both is oriented at a non-vertical angle relative to the bottom.

3. The litter box system of claim 1, wherein at least a portion of the rear wall is oriented at a non-vertical angle relative to the bottom, and that portion includes sufficient angle and area that the box may securely rest upon that portion.

4. The litter box system of claim 1, wherein the canopy comprises a receiving dock and the receiving dock includes the releasable attachment to the scoop.

5. The litter box system of claim 1, wherein the sifting screen element of the scoop includes vertical slats.

6. The litter box system of claim 5, where the slats are spaced apart by about 0.5 to about 1 cm.

7. The litter box system of claim 1, wherein the sifting screen element of the scoop is configured as a lattice, grate, sieve, or other cross-membered structure with openings therein.

8. The litter box system of claim 7, where the openings each include an area from about 0.5 to about 1 cm$^2$.

9. The litter box system of claim 1, wherein an area of the main litter box body between the scoop and the front wall comprises a pet accessible area configured to hold litter.

10. The litter box system of claim 9, wherein the pet accessible area includes indicia of a recommended top level of litter.

11. The litter box system of claim 1, wherein the solid lower wall portion of the scoop includes a tapered thickness such that its lower edge forms a scraping blade.

12. The litter box system of claim 1, wherein the main litter box body includes a separate lower tray element, of which one or more of the walls are oriented at a non-vertical angle to the bottom, and top component of which the walls are all generally vertically oriented relative to the bottom.

13. A method of cleaning the litter box system of claim 1, the method comprising steps of:
    tilting the litter box system from a generally horizontal orientation to a first angled position where the litter reservoir is lower and the front wall is higher;
    removing the scoop from the canopy;
    re-tilting the litter box system from the first angled position to a second angled position where the litter reservoir is higher and the front wall is lower;
    attaching the scoop to the canopy; and
    reorienting the litter box system to a generally horizontal orientation.

14. The method of claim 13, wherein litter material and animal waste are present in the portion of the main litter box body on the opposite side of the scoop from the litter reservoir prior to the tilting step.

15. The method of claim 14, wherein during the step of tilting the litter material generally passes through the scoop, and the animal waste generally is captured by the at least one sifting screen element.

16. The method of claim 15, wherein the step of removing the scoop further includes disposing of the animal waste.

17. The method of claim 14, wherein the step of reorienting the litter box system further includes moving the box in a manner to reposition the litter generally levelly back on the opposite side of the scoop from the litter reservoir after the step of attaching the scoop.

18. The method of claim 13, wherein the step of removing the scoop further comprises scraping at least one interior surface of the main litter box body with the scoop.

19. The method of claim 16, wherein the scraping is directed to removing litter and/or animal waste from the main litter box body.

20. A litter box system comprising:
    a main litter box body including a generally planar bottom with a front wall oriented at an obtuse angle relative to the bottom, a rear wall oriented at an obtuse angle relative to the bottom, and two lateral side walls connecting the front and rear walls extending upward from the bottom;
    a canopy formed as a top wall extending across a rear width of the main litter box body to form, with the rear wall and rear portions of the bottom and lateral side walls, a litter reservoir configured to receive and hold generally unsoiled litter during a cleaning operation; and
    a sifter/scraper scoop removably attached to a receiving dock of the canopy by an actuatable mechanism, where the scoop includes:
        a top handle;
        top wall and side walls forming three sides;
        a rear wall including at least one sifting screen element formed as a generally parallel plurality of vertical slats and a solid lower wall portion extending across the width of the scoop, the lower wall formed as a scraping blade;
    wherein outer contours of the scoop are configured to complement and to be approximately the same dimensions as inner contours across the width and up the lateral sides of the main litter box body.

* * * * *